(12) United States Patent
Floe

(10) Patent No.: US 11,112,058 B2
(45) Date of Patent: Sep. 7, 2021

(54) QUICK ATTACH BRACKET SYSTEM

(71) Applicant: Wayne Floe, McGregor, MN (US)

(72) Inventor: Wayne Floe, McGregor, MN (US)

( * ) Notice: Subject to any disclaimer, the term of this patent is extended or adjusted under 35 U.S.C. 154(b) by 181 days.

(21) Appl. No.: 16/121,246

(22) Filed: Sep. 4, 2018

(65) Prior Publication Data
US 2019/0249824 A1   Aug. 15, 2019

Related U.S. Application Data

(60) Provisional application No. 62/544,564, filed on Aug. 11, 2017.

(51) Int. Cl.
| | |
|---|---|
| *A47B 96/06* | (2006.01) |
| *F16M 13/02* | (2006.01) |
| *F16B 2/06* | (2006.01) |
| *B63C 5/00* | (2006.01) |

(52) U.S. Cl.
CPC .......... *F16M 13/022* (2013.01); *F16B 2/065* (2013.01); *B63C 5/00* (2013.01); *F16B 2200/20* (2018.08)

(58) Field of Classification Search
CPC ...... F16M 13/022; F16M 11/10; F16M 11/22; F16M 11/2092; F16B 2/065; F16B 2200/20; B63C 5/00; H05K 7/186; H05K 7/183; H05K 5/0204
USPC ... 248/222.14, 122.1, 220.21, 279.1, 220.22, 248/222.13, 221.11, 222.52, 222.51, 248/223.31, 225.21; 403/348, 350
See application file for complete search history.

(56) References Cited

U.S. PATENT DOCUMENTS

| | | | | |
|---|---|---|---|---|
| 3,829,050 A * | 8/1974 | Brautaset | ............ | E04F 10/0662 248/222.14 |
| 7,152,836 B2 * | 12/2006 | Pfister | ................... | F16C 11/103 248/292.14 |
| 8,333,355 B2 * | 12/2012 | Stifal | .................. | F16M 11/2092 248/279.1 |
| 9,650,789 B2 * | 5/2017 | Gulnick | .............. | E04F 13/0801 |
| 10,143,104 B2 * | 11/2018 | Baker | ..................... | H05K 7/183 |
| 10,743,437 B2 * | 8/2020 | Ankarbjork | ............ | H05K 7/183 |
| 10,876,299 B2 * | 12/2020 | Dye | ........................ | E04F 13/14 |
| 2005/0167549 A1 * | 8/2005 | Ligertwood | ........... | F16M 11/22 248/122.1 |
| 2008/0156949 A1 * | 7/2008 | Sculler | ................... | F16M 11/10 248/220.21 |
| 2017/0204615 A1 * | 7/2017 | Gulnick | .............. | E04F 13/0803 |

* cited by examiner

*Primary Examiner* — Todd M Epps

(57) ABSTRACT

A quick attach bracket system has a structural member and an attachment bracket. The structural member is installed onto the edge of a dock or other appropriate location, and the attachment bracket may be quickly affixed to the structural member. Attachments may be affixed to the attachment bracket in order to secure the attachments to the structural member. One or more bracket hooks of the attachment bracket are received by corresponding bracket hook receivers of the structural member. A fastener flange connected to the lower end of the attachment bracket further secures the attachment bracket to the structural member through a fastener which can be tightened against a fastener receiver of the structural member. Various attachments such as flagpole brackets, ladders and other items may be attached to the attachment bracket in order to be secured to the structural member.

5 Claims, 5 Drawing Sheets

QUICK ATTACH BRACKET SYSTEM

The current application claims a priority to the U.S. Provisional Patent application Ser. No 62/544,564 filed on Aug. 11, 2017. The current application is filed on Aug. 13, 2018, whereas Aug. 11, 2018 and Aug. 12, 2018 were on a weekend.

FIELD OF THE INVENTION

The present invention relates generally to an attachment bracket. More specifically, the present invention is an apparatus comprised of a structural member and bracket which can be attached to a structural member to secure various items to the structural member.

BACKGROUND OF THE INVENTION

A dock generally provides access to a body of water from shore. It is most commonly used to access watercraft, as well as providing a location to relax or fish from. Docks are generally platforms that provide a walking or driving surface over the water. Docks may be supported by floats or by legs or posts that are either pounded into the lake bottom or sit on the lake bottom, with either wheels or pads attached to the bottom of the leg or post.

Currently, there does not exist a simple, easy means of attaching accessories such as ladders, stairs, flag poles, furniture, bumpers, etc. to the edge of a boat dock. Other bracket attachment methods involve a lot of hardware and/or fasteners, and installation is cumbersome. It is therefore an objective of the present invention to introduce an apparatus which can be easily installed onto the side of a structure to securely attach any desired dock accessories.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a quick attach bracket system comprising a structural member 1 and an attachment bracket 2 which can easily be attached to the structural member 1. The attachment bracket 2 can be attached to the structural member 1 without drilling holes. The present invention has many embodiments with variations in shape. However, in all embodiments, the present invention is comprised of a structural member 1 and attachment bracket 2. Preferably, the structural member 1 has two or more receiver points—preferably with one or more bracket receivers and, in some embodiments, one fastener receiver 14, though the fastener receiver 14 is not a required component. The attachment bracket 2 has one or more downward facing hooks on one face. These hooks attach to the bracket receiver(s) on the structural member 1. Additionally, the bracket comprises an arm which holds an upside-down bolt. This bolt can be tightened to secure the bracket to the structural member 1. All the user needs to do is hang the bracket onto the structural member 1 and tighten the screw. The present invention may be utilized to affix various attachments to the edge of a dock, such as, but not limited to, a flagpole bracket, a bench bracket, a ladder, a railing, a dock bumper, dock furniture, and other attachments. It should be noted that although the present invention is intended for installation on a dock, the present invention may be utilized for any other relevant application.

Figure 1:
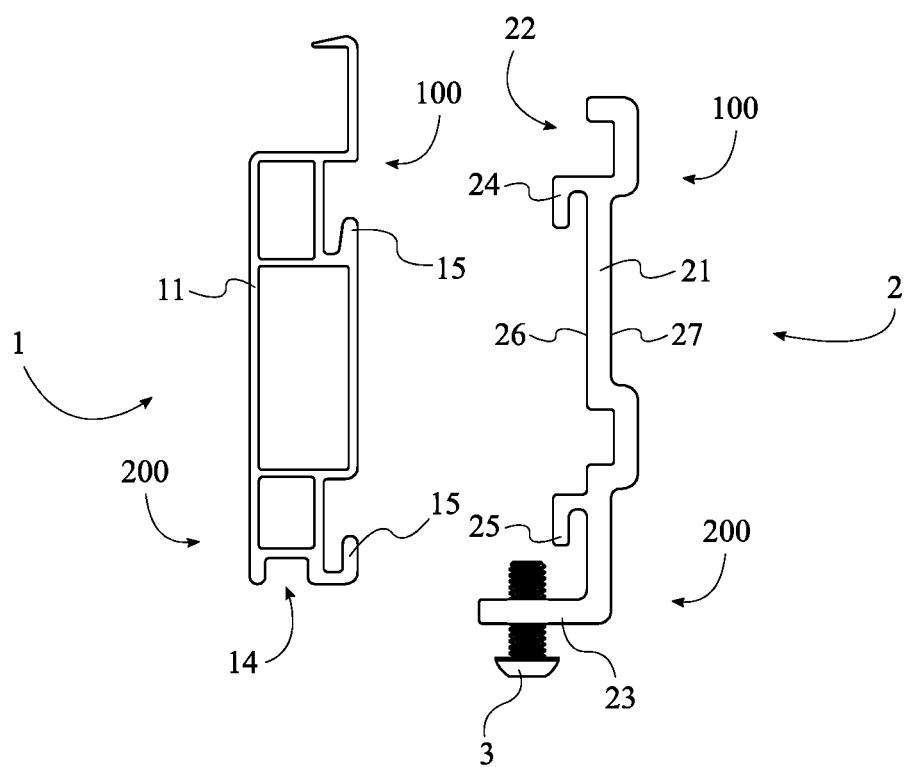
FIG. 1 is a side exploded view of the structural member and attachment bracket.
Figure 2:
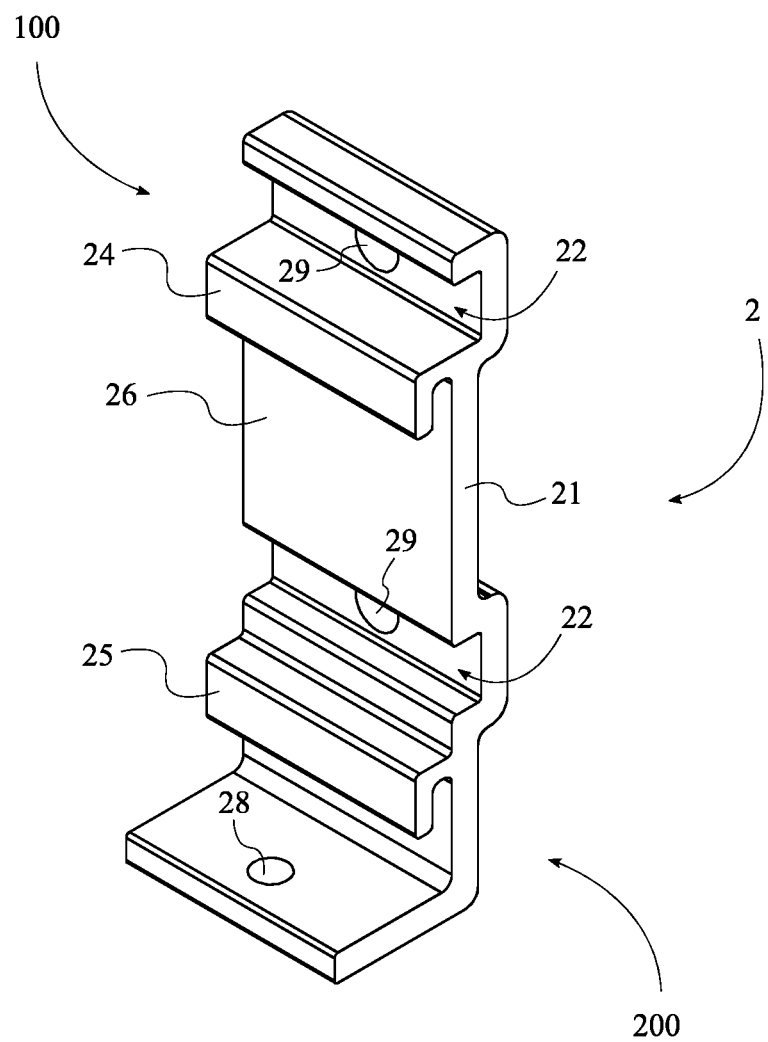
FIG. 2 is a perspective view of one embodiment of the attachment bracket.
Figure 3:
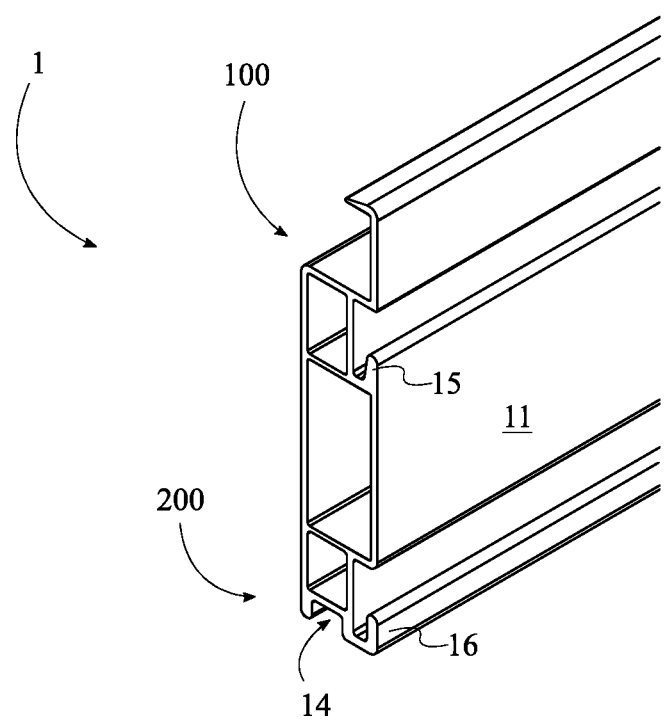
FIG. 3 is a perspective view of a portion of the structural member in one embodiment.

In general, referring to FIGS. 1-3, the present invention comprises a structural member 1, an attachment bracket 2, and a fastener 3. The structural member 1 is intended to be installed along the edge of a boat dock, or in any other suitable location. The attachment bracket 2 is removably fastened to the structural member 1, and further items may be secured to the attachment bracket 2, and thereby to the structural member 1, and thereby to the dock. The fastener 3 is used to secure the attachment bracket 2 to the structural member 1. One or more attachment brackets may be utilized in various situations to attach various items to the structural member 1.

In the preferred embodiment of the present invention, the attachment bracket 2 comprises an attachment body 21, an upper end 100, a lower end 200, a fastener flange 23, and at least one bracket hook. In some embodiments, the at least one bracket hook comprises a first bracket hook 24 and a second bracket hook 25. The attachment body 21 extends between the upper end 100 and lower end 200 of the attachment bracket 2 and is generally oriented vertically when attached to the structural member 1. The fastener flange 23 is perpendicularly and terminally connected to the attachment body 21 at the lower end 200. The fastener flange 23 is used to ensure the attachment bracket 2 is secured to the structural member 1 through the fastener 3.

The preferred embodiment of the present invention comprises two bracket hooks, although it is contemplated that a single bracket hook or more than two bracket hooks may be comprised in various embodiments. In general, one of the at least one bracket hook is connected adjacent to the upper end 100 of the attachment body 21. More particularly, in the preferred embodiment, the first bracket hook 24 is connected adjacent to the upper end 100 of the attachment body 21, and the second bracket hook 25 is connected adjacent to the lower end 200 of the attachment body 21. In other embodiments, the first bracket hook 24 may be spaced apart from the upper end 100 toward the lower end 200. Similarly, in other embodiments, the second bracket hook 25 may be spaced apart from the lower end 200 toward the upper end 100 of the attachment bracket 2. Preferably, the first bracket hook 24 and the second bracket hook 25 are each downward-facing, U-shaped elements, with a first hook member extending perpendicularly and horizontally from the attachment body 21, and a second hook member extending perpendicularly and vertically downward from the end of the first hook member. Furthermore, in some embodiments the attachment body 21 comprises an inner surface 26 and an outer surface 27, which are positioned opposite each other across the attachment body 21. Thus, in some embodiments, the attachment body 21 is a generally straight, rectangular, slab-like element, and when the attachment bracket 2 is affixed to the structural member 1, the inner surface 26 is positioned adjacent to the structural member 1, facing inward, with the outer surface 27 facing outward from the structural member 1. The first bracket hook 24 and the second bracket hook 25 are connected to the inner surface 26, and the fastener flange 23 is furthermore perpendicularly and terminally connected to the inner surface 26.

It is further contemplated that the vertical positioning of the first bracket hook 24 and the second bracket hook 25 may vary in relation to the upper end 100 and the lower end 200. The first bracket hook 24 need not necessarily be positioned adjacent the upper end 100 of the attachment body 21, and the second bracket hook 25 need not necessarily be positioned adjacent the lower end 200 of the attachment body 21, so long as the vertical distance between the first bracket hook 24 and the second bracket hook 25 is appropriate to be attached to the structural member 1.

In the preferred embodiment, the structural member 1 comprises a structural body 11, an upper end 100, a lower end 200, and at least one bracket hook receiver. In some embodiments, the at least one bracket hook receiver comprises a first bracket hook receiver 15 and a second bracket hook receiver 16. Each of the at least one bracket hook is removably positioned within one of the at least one bracket hook receiver. In some embodiments, the structural member 1 may further comprise a fastener receiver 14. The fastener receiver 14 may be used to allow for a standard fastener to be tightened to the proper torque when the fastener heads bottoms out against the bracket's fastener flange. The structural body 11 extends vertically between the upper end 100 and the lower end 200 of the structural member 1, and furthermore is preferably is an elongated member in order to allow multiple attachment brackets along its length along the side of a dock. The structural body 11 may comprise various configurations in various embodiments. The fastener receiver 14 is positioned at the lower end 200 of the structural member 1. In the preferred embodiment, the fastener receiver 14 is a cavity extending vertically upward into the structural body 11, as seen in a cross-sectional view. More particularly, the fastener receiver 14 is a channel extending along the length of the structural body 11. It should be noted that the fastener receiver 14 is not a required component, though it is generally desired for the fastener receiver 14 to be comprised in various embodiments. The fastener receiver 14 allows the fastener to be pressed tight against the fastener flange when the fastener is properly torqued.

In the preferred embodiment, the first bracket hook receiver 15 is connected adjacent to the upper end 100 of the structural body 11, and the second bracket hook receiver 16 is connected adjacent to the lower end 200 of the structural body 11. In other embodiments, the first bracket hook receiver 15 may be spaced apart from the upper end 100 toward the lower end 200 of the structural member 1. Similarly, in other embodiments, the second bracket hook receiver 16 may be spaced apart from the lower end 200 toward the upper end 100 of the structural member 1. A vertical distance between the first bracket hook receiver 15 and the second bracket hook receiver 16 should match a vertical distance between the first bracket hook 24 and the second bracket hook 25. Furthermore, in the preferred embodiment the first bracket hook receiver 15 and the second bracket hook receiver 16 are upward-facing U-shaped elements dimensioned to mate with the first bracket hook 24 and the second bracket hook 25.

Figure 4:
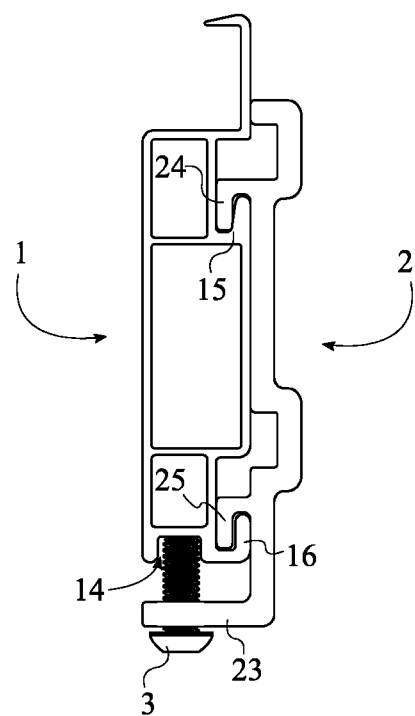
FIG. 4 is a side view of the attachment bracket being affixed to the structural member.

In order to attach the attachment bracket 2 to the structural member 1, the first bracket hook 24 is removably positioned within the first bracket hook receiver 15, and the second bracket hook 25 is removably positioned within the second bracket hook receiver 16. FIG. 4 shows the attachment bracket 2 attached to the structural member 1. The fastener flange 23 is furthermore removably attached to the structural member by tightening the fastener 3 against the structural member. More particularly, in some embodiments, the fastener flange 23 is removably attached to the fastener receiver 14 through the fastener 3. In some embodiments, the fastener 3 is a bolt, and the fastener flange 23 comprises a bolt hole 28. With the fastener receiver 14 traversing into the structural body 11 at the lower end 200, the bolt traverses through the bolt hole 28, such that the fastener 3, or more particularly the end of the bolt opposite the head of the bolt, is removably positioned against the structural member 2; more particularly, in some embodiments, the fastener is removably positioned within the fastener receiver 14, and wherein the fastener flange 23 is affixed adjacent to the fastener receiver 14 through the bolt. The bolt may be tightened against the fastener receiver 14 in order to affix the fastener flange 23 adjacent to the fastener receiver 14 by screwing the bolt in a direction such that the bolt moves toward the fastener receiver 14, and thus is pressed against the fastener receiver 14 and captured within the cavity of the fastener receiver 14 in order to prevent the attachment bracket 2 from disengaging from the structural member 1. This may be accomplished through a nut that is threadedly engaged with the bolt and positioned opposite the head of the bolt along the fastener flange 23, or through the bolt hole 28 itself being threaded.

It is contemplated that in various embodiments, it is not necessary to use a fastener per se, and the fastener receiver 14 may not be comprised in some embodiments. What is desired it to apply a force between the structural member 1 and the attachment bracket 2 such that the bracket hooks are pressed into the bracket hook receivers in order to more securely affix the attachment bracket 2 to the structural member 1. Thus, in lieu of the fastener 3, in some embodiments a compression mechanism may be utilized, such as a clamping mechanism or other mechanism, or any other means of applied the desired force. As such, the compression mechanism may take the place of the fastener 3 and fastener receiver 14, or the compression mechanism may comprise the fastener 3 and fastener receiver 3. In the preferred embodiment, the structural member 1 and the attachment bracket 2 are releasably pressed together through a fastening mechanism. Furthermore, the fastening mechanism is composed of the fastener 3, the fastener flange e, and the fastener receiver 14 as previously described. In various other embodiments, the fastening mechanism may comprise any other applicable means of applying compressive force between the structural member 1 and the attachment bracket 2.

In some embodiments, the attachment bracket 2 may further comprise a fastener hole or a plurality of fastener holes 29. The plurality of fastener holes 29 facilitates attaching various items to the attachment bracket 2 and thus affix the items to the structural member 1. The plurality of fastener holes 29 traverses through the attachment body 21 of the attachment bracket 2 through the inner surface 26 and outer surface 27. In some embodiments, the plurality of fastener holes 29 is positioned between the upper end 100 and the lower end 200. In other embodiments, the position of each of the plurality of fastener holes 29 may vary. The user may affix fasteners such as bolts or screws through the plurality of fastener holes 29, which may be used to support items desired to be affixed to the structural member 1 through the attachment bracket 2. For example, a dock stairs bracket for receiving a set of dock stairs may be affixed to the attachment bracket 2 by inserting a plurality of bolts through the plurality of fastener holes 29, and affixing the dock stairs bracket to the plurality of bolts through corresponding holes in the dock stairs bracket. Other possible attachments may include, but are not limited to, a flag pole bracket, a ladder, a dock bumper, a bench bracket, a table bracket, and others. In some embodiments, the attachment body 21 may further comprise a plurality of fastener channels 22, through which the fastener holes 29 traverse. The fastener channels 22 provide a recess into the inner surface 26 of the attachment body 21 so that, for example, where bolts are used as fasteners with the fastener holes 29, the heads of the bolts may reside flush with the inner surface 26 of the attachment body 21 and avoid obstructing the attachment body 21 being pressed against the structural member 1.

In some embodiments, the attachment bracket 2 further comprises a support hook 4. The support hook 4 may be used to support and capture various items to be affixed to the structural member 1. Preferably, the support hook 4 is terminally and perpendicularly connected to the attachment body 21 adjacent to the lower end 200 of the attachment body 21, and is further connected to the outer surface 27, opposite the first bracket hook 24 and the second bracket hook 25 through the attachment body 21. The support hook 4 may further comprise a fastener hole traversing through a distal arm of the support hook 4 in order to fasten an item within the support hook 4.

Figure 5:
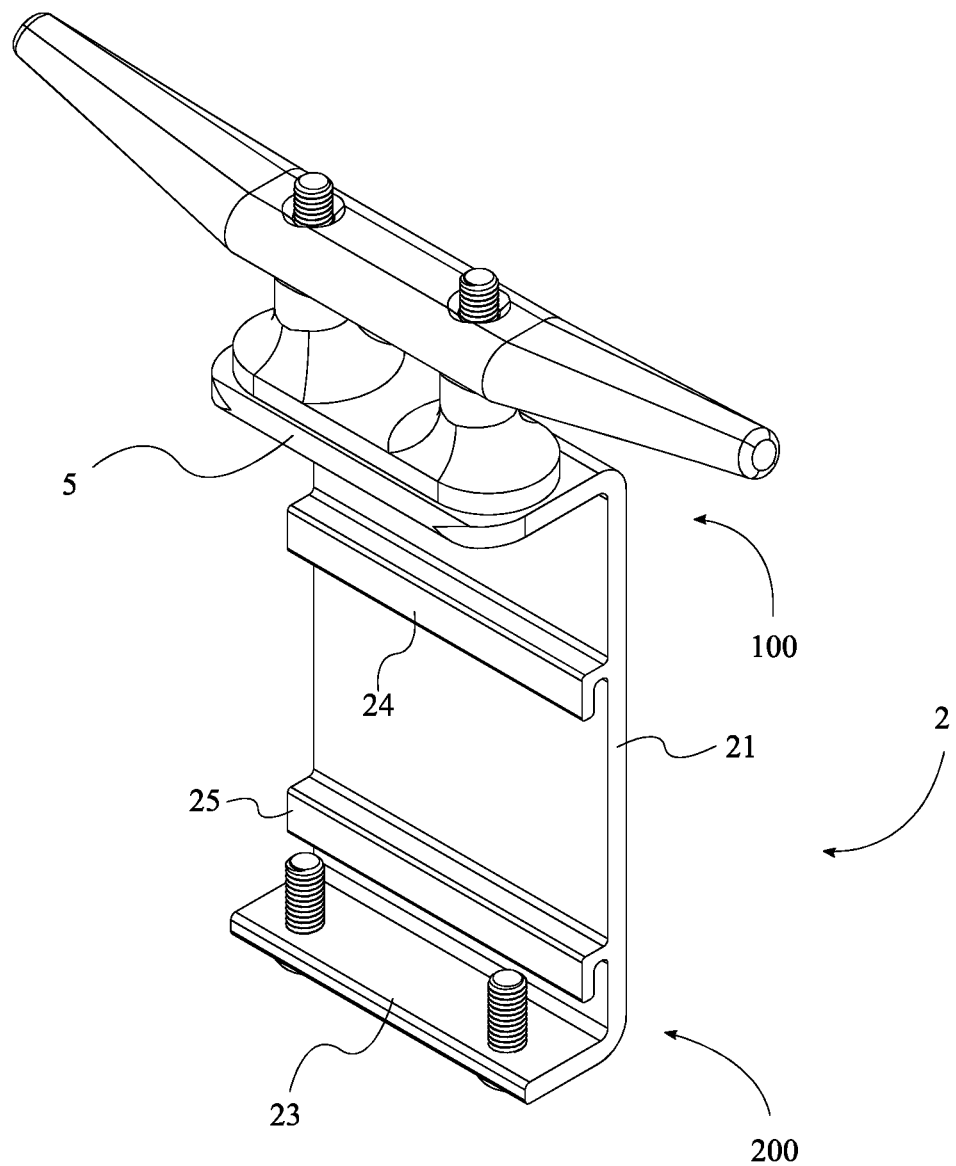
FIG. 5 is a perspective view of the attachment bracket in another embodiment with an attached dock cleat.

In some embodiments, the attachment bracket 2 further comprises a dock cleat flange 5, as shown in FIG. 5. The dock cleat flange 5 is terminally and perpendicularly connected to the upper end 100 of the attachment body 21, so that when the attachment bracket 2 is installed onto the structural member 1, a dock cleat may be affixed atop the dock cleat flange 5 in a proper position to be utilized to secure a boat to a dock to which the structural member 1 is connected. In some embodiments, a dock cleat may be permanently connected atop the dock cleat flange 5.

Thus, in view of the foregoing disclosure, the present invention presents a quick attach bracket system through which a variety of accessories, such as, but not limited to, a flagpole brackets, ladders, dock bumpers, dock cleats, benches, chairs, tables, and other items may be affixed to a structural member 1 installed on the edge of a boat dock through an attachment bracket 2.

Although the invention has been explained in relation to its preferred embodiment, it is to be understood that many other possible modifications and variations can be made without departing from the spirit and scope of the invention as hereinafter claimed.

What is claimed is:
1. A quick attach bracket system comprising:
a structural member;
an attachment bracket;
a bolt;
the attachment bracket comprising an attachment body, an upper attachment end, a lower attachment end, a first bracket hook, a second bracket hook, a fastener flange and a bolt hole;
the attachment body extending between the upper attachment end and the lower attachment end;
the first bracket hook being connected adjacent to the upper attachment end;
the second bracket hook being connected adjacent to the lower attachment end;
the fastener flange being perpendicularly and terminally connected to the attachment body at the lower attachment end;
the bolt hole being formed on the fastener flange;
the structural member comprising a structural body, an upper structural end, a lower structural end, a first bracket hook receiver, a second bracket hook receiver and a fastener receiver;
the structural body extending between the upper structural end and the lower structural end;
the first bracket hook receiver being connected adjacent to the upper structural end;
the second bracket hook receiver being connected adjacent to the lower structural end;
the fastener receiver being positioned at the lower structural end;
the fastener receiver traversing into the structural body at the lower structural end;
the first bracket hook being removably positioned within the first bracket hook receiver;
the second bracket hook being removably positioned within the second bracket hook receiver; and
the structural member and the attachment bracket being releasably pressed together by the fastener flange being removably attached to the fastener receiver, the bolt being removably positioned through the bolt hole and the bolt being removably positioned within the fastener receiver.

2. The quick attach bracket system as claimed in claim 1 comprising:
the attachment body comprising an inner surface and an outer surface; and
the fastener flange being perpendicularly and terminally connected to the inner surface.

3. The quick attach bracket system as claimed in claim 1 comprising:
the attachment body comprising an inner surface and an outer surface;
the fastener flange being perpendicularly and terminally connected to the inner surface; and
the first bracket hook and the second bracket hook being connected to the inner surface.

4. The quick attach bracket system as claimed in claim 1 comprising:
the attachment bracket comprising a plurality of fastener holes; and
the plurality of fastener holes traversing through the attachment body between the upper attachment end and the lower attachment end.

5. The quick attach bracket system as claimed in claim 1 comprising:
the attachment bracket comprising a support hook; and
the support hook being terminally and perpendicularly connected to the attachment body adjacent to the lower attachment end, opposite the first bracket hook and the second bracket hook.

* * * * *